July 16, 1963   R. C. SPENCER, JR., ETAL   3,098,190
CONTROL APPARATUS FOR REGULATING AN OVERSPEED
CONDITION OF AN ELECTRIC GENERATOR
Filed Dec. 8, 1960
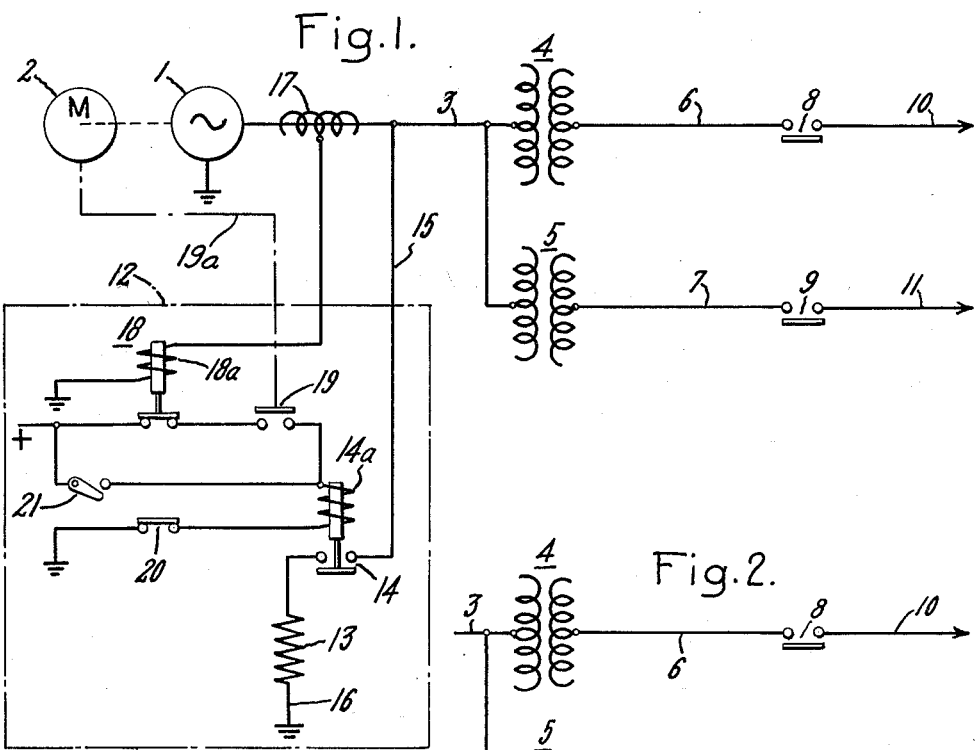
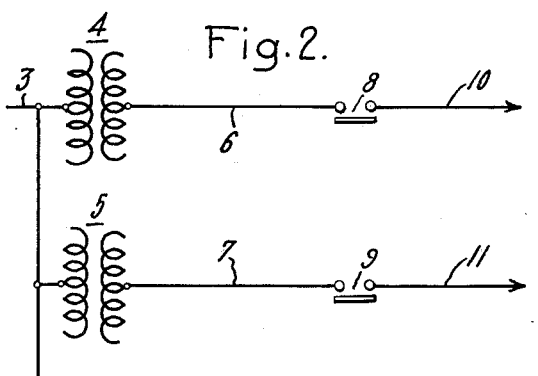
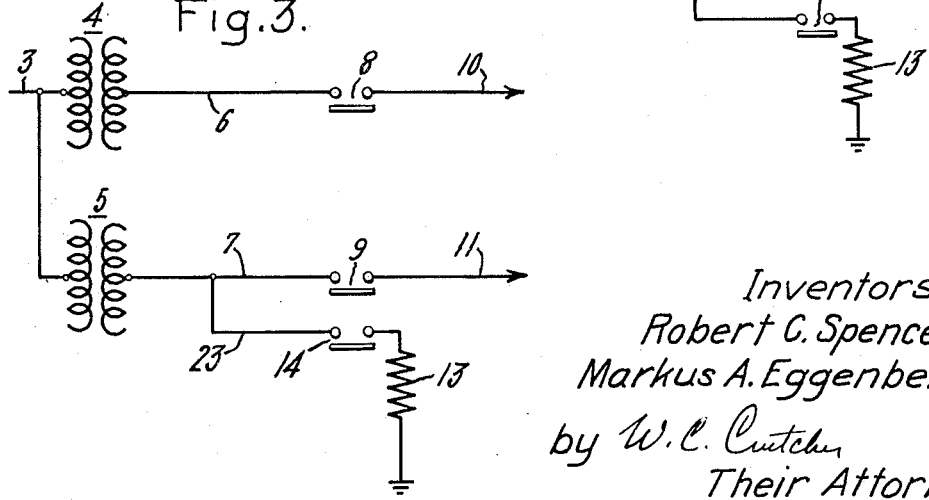
Inventors
Robert C. Spencer Jr.
Markus A. Eggenberger
by W. C. Crutcher
Their Attorney United States Patent Office 3,098,190
Patented July 16, 1963

3,098,190
CONTROL APPARATUS FOR REGULATING AN OVERSPEED CONDITION OF AN ELECTRIC GENERATOR
Robert C. Spencer, Jr., Scotia, and Markus A. Eggenberger, Schenectady, N.Y., assignors to General Electric Company, a corporation of New York
Filed Dec. 8, 1960, Ser. No. 74,627
4 Claims. (Cl. 322—29)

This invention relates to control apparatus and, more particularly, to control apparatus for regulating an overspeed condition of a prime mover driven electric generator.

On an electric generator driven by a prime mover, such as a steam turbine, the power transmitted from the prime mover to the generator shaft is, under normal conditions, always substantially the same as the output power of the generator. As long as this power balance persists there will be no power available to accelerate the turbine shaft which consequently runs at a constant speed.

If the load is suddenly removed from the generator without simultaneously reducing the energy input to the prime mover correspondingly, there will be an unbalance between input power to the generator which remains temporarily unchanged and the output power which becomes substantially zero on account of the loss of load. The excess power input will be available to accelerate the rotor of the prime mover-generator unit at a rapid rate and would produce an undesirable overspeed condition if the control devices on the prime mover would not reduce the motive fluid flow to the prime mover sufficiently within a short enough time to reduce the power unbalance to zero before the rotor reaches an undesirably high speed.

The acceptable amount of energy (power×time) which can be absorbed in accelerating the rotating parts is determined by the difference between the original (rated) speed and the maximum permissible speed and the rotational inertia ($WR^2$) of the rotating parts.

The permissible peak speed for steam turbine prime movers has traditionally been 110% of rated speed, because this is the setting of the emergency governor which will shut down the prime mover entirely if the speed exceeds this value. Most users of steam turbine prime movers insist on holding the peak speed below 110% if maximum load is lost instantly.

The rotational inertia of a turbine-generator depends on its design. In recent years technology has progressed rapidly to reduce the $WR^2$ of rotating machinery for a given output rating such that the energy which can be absorbed in accelerating the rotor has steadily decreased. In addition to this, the time in which the rotor would accelerate from 100 to 110% of rated speed with full input power and zero output power has steadily decreased because of the decreasing $WR^2$ on newer units.

It has, therefore, been increasingly difficult to design control systems for steam turbines which would reduce the steam flow to the turbine quickly enough to hold the peak speed on loss of load below 110% of rated speed.

Heretofore, various arrangements have been considered to reduce overspeed on an electric generator when a load is suddenly removed from the generator. One suggested arrangement consists of placing a large flywheel on either the generator or its prime moving equipment thereby increasing the rotational inertia of the rotor which increases its capability of absorbing energy. This expedient is in direct contradiction to the development of the technology which tries to get more power with less weight and is, therefore, obsolete.

Another type of apparatus that has been considered to reduce overspeed on an electric generator comprises the use of a reversing turbine that operates to put a supplementary negative torque on the prime mover when load is suddenly removed from the generator. Such arrangements are expected to be difficult to control rapidly enough and appear to be extremely expensive. Furthermore, reversing turbines would subject the generating system to an additional loss caused by the idle turbine bucket rotation when the turbine is being driven in its forward direction.

Still another help for reducing generator overspeed is the provision of fast opening steam valves that relieve trapped high pressure steam from between the controlling valves and the turbine thus preventing this steam from expanding through the turbine thereby releasing energy which would accelerate the rotor. Such valves represent a difficult maintenance problem and their effectiveness is limited to the amount of trapped steam they can release.

The present invention affords a solution to the above-mentioned problems by providing control apparatus for an electric generator that helps prevent an overspeed condition from occurring in the generator when a load is suddenly substantially reduced or removed therefrom by absorbing excess energy from the prime moving equipment of the generator.

Accordingly, it is a specific object of the invention to provide means responsive to a predetermined unbalance between the input and the output of an electric generator for regulating an overspeed condition of the generator.

Another object of the invention is to provide control apparatus that regulates an overspeed condition of an electric generator by absorbing energy from the prime moving equipment of the generator when a predetermined unbalance exists between the power input and the electric output of the generator.

A further object of the invention is to provide an electric generator overspeed control apparatus having means responsive to the electric output of the generator for absorbing excess energy from the generator's prime moving equipment for a predetermined time interval upon the occurrence of a predetermined unbalance between the power input and the electric output of the generator.

A still further object of the invention is to provide an electric generator control apparatus for regulating an overspeed condition of the generator including means for testing the control apparatus without necessitating the removal of a primary load from the generator.

Briefly stated, in accordance with a preferred embodiment of the invention, sensing means are provided to detect an unbalance of a predetermined magnitude between the power input and the output of an electric generator, and further means are provided for connecting an impedance of predetermined value across the output of the generator to absorb energy from the generator drive system in response to the sensing means detecting a predetermined unbalance between the power input and the electrical output of the generator. More specifically, when a primary load is abruptly disconnected from the generator, the sensing means acts to cause the impedance to be connected across the output of the generator for a predetermined time interval such that the impedance absorbs sufficient energy to prevent the generator from reaching an undesirable overspeed condition.

Further objects and advantages of the invention will become apparent from the description that follows taken in conjunction with the drawing in which:

FIG. 1 is a schematic electric circuit diagram showing an electric generator provided with overspeed control apparatus in accordance with the present invention;

FIG. 2 is a fragmentary schematic electric circuit diagram showing an alternative means of connecting the overspeed regulating impedance shown in FIG. 1 to the output circuit of an electric generator; and FIG. 3 is a fragmentary schematic electric circuit diagram showing still another means for connecting the overspeed regulating impedance shown in FIG. 1 to the output circuit of an electric generator.

With reference to FIG. 1, one embodiment of the overspeed control apparatus of the invention will now be described in detail. By way of example, the overspeed control apparatus of the invention will be described as it may be utilized to partially control an overspeed condition of an electric generator that is driven by a steam turbine; however, the invention is not necessarily limited in its adaptability to any particular prime mover. In FIG. 1, an electric generator 1 is connected by a suitable drive means to a prime mover 2, which may comprise a steam turbine. The electrical output of generator 1 is connected through conventional circuit means, shown as a conductor 3, through a conventional type of transformer and circuit breaker arrangement to a load (not shown). By way of example, such a conventional arrangement is shown as comprising a main transformer 4 and an auxiliary transformer 5 shown connected to conductor 3 and electrical conductors 6 and 7 respectively. A main circuit breaker 8 and an auxiliary circuit breaker 9 are shown as being electrically connected to conductors 6 and 7 and conductors 10 and 11 respectively leading to the respective loads (not shown).

The foregoing circuit arrangement does not form an important aspect of the present invention and, as the description of the invention proceeds, it will be seen that any coventional circuit arrangement may be utilized to connect the electrical output of generator 1 to a load. The rotating parts of electrical generator 1 and prime mover 2 are subject to being driven to overspeed if load is suddenly removed from generator 1. For example, if for any reason the electric circuit supplying the load should become open-circuited, any excess driving torque applied to the generator 1 by the prime mover or turbine 2 will accelerate the generator 1 to an overspeed condition.

In accordance with the present invention, an overspeed control apparatus, which is depicted generally within the block outline 12, is provided to help in reducing the overspeed of generator 1. The overspeed control apparatus 12 includes an electrical impedance 13 that is electrically connected in series with a pair of normally open circuit breaker contacts 14 and thence through electrical current conductors 15 and 16 across the output of generator 1. Thus, when the contacts 14 are closed, the electrical impedance 13 is connected across the output of generator 1 and serves to load the generator 1. In the preferred embodiment of the invention, the impedance 13 is a resistor of a kilowatt rating determined by the characteristic of the entire system and on how much excess energy is to be absorbed. The resistance element 13 need only be of sufficient size to absorb this energy within a predetermined time interval to prevent the generator 1 from exceeding a predetermined overspeed value when full load on the generator 1 is suddenly removed or disconnected therefrom. Impedance 13 is carefully calculated so as to provide sufficient overspeed protection while limiting its rating so that it will not be too costly. A simplified method for calculating the magnitude of resistor 13 will be explained in detail below.

In order to provide means for connecting the impedance 13 across the output of generator 1 within a very short time interval after the output of generator 1 drops below a predetermined value, an actuating coil 14a for contacts 14 is energized in response to the output of generator 1 dropping below such a predetermined level. In FIG. 1, this function is afforded by disposing a current transformer 17 in inductive relation with the conductor 3 and connecting an undercurrent relay 18 comprising a pair of contacts, and an energizing coil 18a, to the transformer 17 in a manner such that the energizing coil 18a of the relay 18 is sufficiently energized to maintain the relay contacts open when the power output of generator 1 is above a predetermined value, such as 25% of the generator output rating. Thus, when the generator 1 is providing more than 25% of its maximum output to the primary load, the actuating coil 18a of the undercurrent relay is energized and holds contacts of relay 18 open. Of course, any suitable sensing means could be utilized to detect a variation of predetermined magnitude in the output of generator 1, and the transformer 17 and undercurrent relay 18 are merely exemplary.

The actuating coil 14a of switch contacts 14 is electrically connected in series with the contacts of relay 18 and a source of electrical energy (not shown) thereby to afford means for energizing the actuating coil 14a when the contacts of relay 18 are closed due to the de-energization of undercurrent relay coil 18a when current from the generator to the load falls below a minimum value.

In addition to the coil 14a and the contacts of relay 18, a pressure responsive switch 19 and a time limit switch 20 are electrically connected in series across the power source (not shown), and a manually operable switch 21 is connected in parallel with the contacts of relay 18 and the pressure responsive switch. These added components may afford very important advantages when the invention is used with a turbine generator. More specifically, the pressure responsive switch 19 is adjusted to close when the pressure of steam in some particular stage of the turbine 2 is above a predetermined value, as indicated by line 19a connecting pressure responsive switch 19 with turbine 2. Therefore, during normal operation of the generator 1 and turbine 2 the switch 19 will be maintained in its closed position, but if the steam pressure in the considered stage of the turbine 2 drops below the predetermined value, the contacts 19 will be opened thereby to prevent the actuating coil 14a from closing the contacts 14 to add the impedance 13 to the load on the generator 1 if the load of the generator should drop below 25%.

The contacts of time limit switch 20 are normally closed and are operable to open a predetermined interval of time after the coil 14a, for operating contacts 14, has been energized. The time interval for which the time-limit switch 20 is set to open its contacts may vary for different applications of the overspeed control apparatus of the invention. In a large reheat steam turbine driving a generator, employing an impedance 13 having a rating to provide sufficient protection at minimum cost, the time-limit switch 20 will be set to open between 1.3 and 1.5 seconds, for example, after the coil 14a has been energized. Thus, the interval of time that the impedance 13 is connected across the output of generator 1 by the switch contacts 14 is determined by the time-limit switch 20. By adjusting this time interval, it is possible to afford the desirable overspeed reduction of the invention while maintaining the magnitude of the impedance 13 at its lowest possible value, thus, the overall expense of the overspeed control apparatus of the invention is maintained at a minimum. The details of the time-limit switch 20 are not described since such arrangements are many and varied and are well known.

A manually operated switch 21 is provided so that the overspeed apparatus of the invention may be tested without necessitating a removal of the load from generator 1. In order to utilize the switch 21 to test the overspeed control apparatus when the generator 1 is being operated to supply power to a load, it is only necessary to manually close the contacts of switch 21 and thereby energize the actuating coil 14a to close the contacts 14 and thus place the impedance 13 across the output of generator 1. Since the time switch 20 is operative during this test period, it will leave the relay coil 14a energized only for the predetermined time on the order of 1.3 to 1.5 seconds. Therefore, the resistor 13 will be subjected to one normal "duty cycle" and will not be continuously energized. The timing relay will reset to be ready for another timing cycle as soon as the test switch is reopened.

From the foregoing description of the invention, it is possible to gain an appreciation of the numerous advantages inherent in this novel means of reducing overspeed in an electric generator. In order to afford the advantages of the invention without requiring the overspeed controlling impedance 13 to be directly coupled to the output conductor 3 of generator 1, the circuits shown in FIGS. 2 and 3 are presented as illustrative of other methods of connecting the impedance 13 to afford the desired overspeed control. In FIGS. 2 and 3 the same numerals that were utilized in FIG. 1 are again employed to designate like components of these circuits. The prime mover 2, generator 1, current transformer 17 and the control circuit 12 have been omitted to avoid repetition. The generator output conductor in FIGS. 2 and 3 has been labeled 3 as in FIG. 1.

In FIG. 2, the impedance 13 is coupled to the output conductor 3 through a coupling transformer 22 that is provided for this express function. It is understood that contacts 14 in FIG. 2 are actuated by a coil such as coil 14a shown in FIG. 1. This particular arrangement of the circuit has the added advantage of allowing the overspeed controlling impedance 13 and the associated circuit breaker contacts 14 and operating coil 14a, as well as the remainder of the overspeed control circuit 12, as shown in FIG. 1, to be enclosed in a single unit that is readily connected to a previously installed turbine-generator. Of course, it will be appreciated that when such a circuit is employed the transformer 22 will continuously subject the output of generator 1 to its no-load losses; therefore, although this system is more flexible than that shown in FIG. 1, it may prove slightly less efficient to operate.

The circuit shown in FIG. 3 combines the low-loss advantages of the circuit of FIG. 1 with the low-voltage requirements for the circuit breaker contacts 14 in FIG. 2. In particular, in the circuit depicted in FIG. 3, the circuit breaker contacts 14 are connected via conductor 23 to conductor 7 so that the auxiliary transformer 5, also shown in FIG. 1, serves as a coupling transformer for the circuit from contacts 14 and the impedance 13 and thus reduces the voltage applied across the contacts 14 and impedance 13. Since the auxiliary transformer 5 already is provided for auxiliary load purposes, no additional no-load losses are applied to the system by this circuit arrangement.

The objects and advantages of the applicants' invention will be apparent from the foregoing description and the mode of operation of the invention should also be apparent to those skilled in the art. However, to more fully explain the precise nature of the invention, a value for a given impedance 13 to be used with a given size generator 1 and steam turbine 2 will be calculated to outline the basic parameters necessary in making such a calculation. In order to reduce the overspeed of a unit of predetermined kilowatt rating by a given number of percent of rated speed, it is only necessary to apply a certain resistance for a given length of time. The resistor rating for one percent reduction of overspeed can be calculated as follows. The energy $\Delta E_R$ absorbed by the impedance 13 may be stated by the following formula in which $KV_R$ equals the voltage in kilovolts applied to the impedance, and $I_R$ equals the current flowing through the resistor 13: $\Delta E_R = \Delta t (KV_R) I_R \sqrt{3}$ ... in kw.-sec., where $(KV_R) I_R \sqrt{3}$ is the kw. rating of the resistor.

The energy which must be absorbed in order to reduce the peak speed of the generator 1 by 1%, where $(WR^2)$ is the moment of inertia of the rotating parts expressed in lb.-ft.-sec.$^2$ is: $\Delta E_{1\%} = 0.0629 (WR^2)$ ... in kw.-sec.

Therefore, the necessary size of the impedance 13, assuming it remains connected for a time interval $\Delta t$ of 1.3 sec. and shall reduce the peak speed by 1% of rated speed becomes: $KW_{R1\%} = 0.0484 (WR^2)$ ... in kw. rating.

Of course, to reduce the overspeed by 5%, for example, it would only be necessary to multiply this figure by a factor of 5.

It will be appreciated from the foregoing calculations that for any given electric generator 1, a particular value of impedance 13 may be calculated exactly to prevent a predetermined percentage of overspeed of the generator when a load is suddenly removed therefrom.

While particular embodiments of the invention for alleviating an overspeed condition in an electric generator have been illustrated and described, it will be obvious to those skilled in the art that various modifications may be made in the invention without departing from its broader aspects. Therefore, it is intended in the following appended claims to encompass all such modifications as fall within the true scope of the invention.

What we claim as new and desire to secure by Letters Patent of the United States is:

1. Control apparatus for regulating an overspeed condition of an electric generator driven by a prime mover, both having rotating parts, comprising an impedance of predetermined magnitude, means for selectively electrically connecting said impedance to said generator, timing means for disconnecting the impedance from the generator in a predetermined time interval after the impedance has been connected, and detecting means connected to actuate said selective connecting means when an unbalance of preselected magnitude occurs between the prime mover input power and the generator electrical output power, said time interval, the magnitude of the load impedance and the power unbalance being so preselected with respect to one another and with respect to the moment of inertia of the rotating parts of the prime mover and generator so that the overspeed of said rotating parts due to said power unbalance is held within a predetermined range.

2. Control apparatus for regulating an overspeed condition of an electric generator driven by a prime mover, both having rotating parts, comprising an impedance of predetermined magnitude, means for selectively electrically connecting a load to said generator, means responsive to a predetermined unbalance between the input power to said generator and its output power for electrically connecting said impedance to said generator, timing means for disconnecting said impedance from said generator after a predetermined time interval, said time interval being of such duration and said impedance being of such magnitude, with respect to both the predetermined power unbalance and the moment of inertia of the rotating parts that enough energy is absorbed by said impedance to prevent the rotating parts of the generator and prime mover from being driven to exceed a predetermined overspeed condition when said predetermined unbalance between input power and output power occurs.

3. Control apparatus for regulating an overspeed condition of an electric generator driven by a prime mover comprising an impedance of predetermined magnitude, means for electrically connecting said generator to a load, an electric circuit breaker including an actuating coil and a pair of contacts, means electrically connecting the contacts of said circuit breaker in series with said impedance to said generator, a first source of electric current electrically connected in series with said coil, a relay having a pair of circuit interrupting contacts electrically connected in series with said coil and said first source of current, a transformer having one winding thereof disposed in inductive relation with the current supplied by the generator to the load to provide a second source of electric current proportional to generator output, said transformer being electrically connected to energize said relay thereby to maintain the relay contacts open when the load exceeds a predetermined value and to effect a closing of said contacts when the load current falls below said predetermined value, a time-limit switch having a pair of circuit-interrupting contacts electrically connected in series with the actuating coil of said circuit breaker, said time-limit switch being effective to open its series-connected contacts after a predetermined time interval, means responsive to the energization of the actuating coil of said circuit breaker for initiating said time interval, a second switch electrically connected in parallel with the contacts of said relay, said second switch being adapted for operation independent of the operation of said relay thereby to afford means for testing the overspeed regulating means by energizing the actuating coil of said circuit breaker to connect the impedance to the generator without interrupting the load current of said generator.

4. Control apparatus for regulating an overspeed condition of an electric generator driven by a prime mover, both having rotating parts, comprising means for electrically connecting said generator to a load, an impedance of predetermined magnitude, an electric circuit breaker including an actuating coil and a pair of contacts, circuit means for electrically connecting the contacts of said circuit breaker in series with said impedance to said generator, a first source of electric current electrically connected in series with the actuating coil of said circuit breaker, first, second and third relays having first, second and third sets of circuit-interrupting contacts respectively electrically connected in series with said actuating coil and said first source of current, means for closing said first set of contacts when the generator power output falls below a first predetermined value, including a transformer having one winding thereof disposed in inductive relation with current supplied by the generator to the load to provide a second source of electric current proportional to generator output and connected to the first relay, means responsive to an operating condition of the prime mover for closing said second set of contacts when the power input to the generator exceeds a second predetermined value, including a pressure responsive switch electrically connected to energize said second relay, means responsive to the energization of the actuating coil of said circuit breaker for opening said third set of contacts after a predetermined time interval, said time interval and the magnitude of said impedance being so preselected with respect to both the power unbalance required to close the first and second sets of contacts and the moment of inertia of the rotating parts of the prime mover and generator, so that the overspeed of the rotating parts due to the occurrence of said power unbalance is held within a predetermined range.

References Cited in the file of this patent

UNITED STATES PATENTS

| | | |
|---|---|---|
| 1,669,522 | Innes | May 15, 1928 |
| 1,705,688 | Staege | Mar. 19, 1929 |
| 1,834,807 | Skeats | Dec. 1, 1931 |
| 1,935,292 | Griscom et al. | Nov. 14, 1933 |
| 2,828,448 | Perkins et al. | Mar. 25, 1958 |
| 2,948,843 | Klein | Aug. 9, 1960 |